US012152462B2

(12) United States Patent
Elyas et al.

(10) Patent No.: US 12,152,462 B2
(45) Date of Patent: Nov. 26, 2024

(54) HYDRAULICALLY DRIVEN CEMENT DOWNHOLE MIXING ENHANCER APPARATUS

(71) Applicant: SAUDI ARABIAN OIL COMPANY, Dhahran (SA)

(72) Inventors: Odai A. Elyas, Dammam (SA); Abdulwahab S. Aljohar, Dhahran (SA); Abdullah S. Al-Yami, Dhahran (SA); Amjad Shaarawi, Khobar (SA); Mohammed Murif Al-Rubaii, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 160 days.

(21) Appl. No.: 17/648,583

(22) Filed: Jan. 21, 2022

(65) Prior Publication Data

US 2023/0235641 A1 Jul. 27, 2023

(51) Int. Cl.
*E21B 33/14* (2006.01)
*B01F 27/50* (2022.01)
(Continued)

(52) U.S. Cl.
CPC .............. *E21B 33/14* (2013.01); *B01F 27/50* (2022.01); *B01F 35/32015* (2022.01); *B28C 5/14* (2013.01); *B01F 2101/28* (2022.01)

(58) Field of Classification Search
CPC ....................................................... E21B 21/00
See application file for complete search history.

(56) References Cited

U.S. PATENT DOCUMENTS 5,695,015 A 12/1997 Barr et al.
6,223,840 B1 5/2001 Swietlik
(Continued)

FOREIGN PATENT DOCUMENTS

CN 105064952 A 11/2015
CN 205063870 U 3/2016
(Continued)

OTHER PUBLICATIONS

International Search Report and Written Opinion issued in Application No. PCT/US2021/061163, mailed on Mar. 4, 2022 (12 pages).

(Continued)

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

A pipe section is disclosed. The pipe section includes a tubular body with a wall defining an interior flow path extending axially through the tubular body and a turbine assembly assembled to a first portion of the wall. The turbine assembly includes a link rod extending through the wall, from an interior of the tubular body to an exterior of the tubular body, an inner turbine mounted on the link rod in the interior of the tubular body, wherein the inner turbine is rotatable about the link rod, and an outer impeller mounted on the link rod at the exterior of the tubular body, wherein the outer impeller is rotatable about the link rod. The pipe section further includes a protective shield disposed around the outer impeller.

19 Claims, 8 Drawing Sheets

(51) Int. Cl.

| | |
|---|---|
| ***B01F 35/32*** | (2022.01) |
| ***B28C 5/14*** | (2006.01) |
| *B01F 101/28* | (2022.01) |

(56) References Cited

U.S. PATENT DOCUMENTS

| | | | |
|---|---|---|---|
| 7,090,023 B2 | 8/2006 | Haugen et al. | |
| 10,961,791 B2 | 3/2021 | Fleckenstein et al. | |
| 2004/0129427 A1* | 7/2004 | Sharp | E21B 43/129 166/370 |
| 2004/0188145 A1 | 9/2004 | Moyes | |
| 2022/0170331 A1* | 6/2022 | Al-Johar | E21B 4/16 |

FOREIGN PATENT DOCUMENTS

| | | |
|---|---|---|
| CN | 110159185 A | 8/2019 |
| CN | 209761367 U | 12/2019 |
| WO | 2005093204 A1 | 10/2005 |

OTHER PUBLICATIONS

Office Action issued in U.S. Appl. No. 17/106,655; dated Mar. 31, 2022 (12 pages).

* cited by examiner

HYDRAULICALLY DRIVEN CEMENT DOWNHOLE MIXING ENHANCER APPARATUS

BACKGROUND

Cementing operations are an integral part of drilling wells in the oil and gas industry. Cementing operations may be performed to install casing in a well, where cement may be pumped in the well between the casing and the wellbore wall. For example, as shown in FIG. 1, a casing string 12 (formed of a plurality of casing pipe segments connected together in an end-to-end fashion) may be lowered into a well 10 and suspended in the well by a casing hanger (not shown) at the wellhead 11 of the well. In some cementing operations, a casing may be hung from an end of a previously installed casing, in which case, the casing is often referred to as a liner. While the casing 12 is suspended in the well 10, cement 15 may be pumped through the casing 12 and around the bottom of the casing 12 to be directed in an opposite direction through an annulus 14 formed between the casing 12 and the wellbore wall 16. After pumping the cement 15 to fill the annulus 14 between the casing 12 and the wellbore wall 16, the cement 15 may harden and hold the casing 12 in place. Cementing operations, among other things, may provide zonal isolation, prevent aquifer contamination, and ensure optimal production throughout the life of the well. Cement pumping pressure is crucial in avoiding induced losses caused by excessive pumping pressures of viscous fluids in low fracture pressure formations. As such, Precautions may be taken during cementing operations to determine optimal pumping pressures for each well section. Determining an optimal cement pumping pressure requires compromise between an upper limit based on surrounding formation fracture pressure and a lower limit based on a minimum pumping pressure to ensure complete and proper cement distribution. For example, in considering the upper limit, excessive pumping pressure (e.g., greater than the fracture pressure of the surrounding formation) may create fractures in a surrounding formation, which may lead to fluid losses through the generated cracks. When considering the lower limit, the pressure and corresponding flow rate of the cement must be high enough to ensure sufficient displacement of cement across the entire well before cement thickening. In many cases, high cement pump rate is preferred, particularly in formations where high fracture pressures are present and in casing cementing operations. High cement pump rates can reduce the overall duration of cementing operations, reduce costs, and, in some cases, improve quality of cementing operations due to better cement mixing and distribution around the casing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a pipe section. The pipe section may include a tubular body having a wall defining an interior flow path extending axially through the tubular body and a turbine assembly assembled to a first portion of the wall. The turbine assembly may include a link rod extending through the wall, from an interior of the tubular body to an exterior of the tubular body, an inner turbine mounted on the link rod in the interior of the tubular body, wherein the inner turbine is rotatable about the link rod, and an outer impeller mounted on the link rod at the exterior of the tubular body, wherein the outer impeller is rotatable about the link rod. The pipe section may further include a protective shield disposed around the outer impeller.

In another aspect, embodiments disclosed herein relate to a system which may include a casing disposed in a wellbore within a well, where an annulus may be created between the casing and the wellbore, and a mixing pipe section may be coaxially connected to the casing. The mixing pipe section may include a turbine assembly assembled to a wall of the mixing pipe section. The turbine assembly may include a link rod extending through the wall, from an interior of the mixing pipe section to an exterior of the mixing pipe section, an inner turbine mounted on the link rod in the interior of the mixing pipe section, wherein the inner turbine is rotatable about the link rod, and an outer impeller mounted on the link rod at the exterior of the mixing pipe section, such that the outer impeller is disposed in the annulus, wherein the outer impeller is rotatable about the link rod.

In yet another aspect, embodiments disclosed herein relate to a method, which may include providing a string of pipe extending through a well. The string of pipe may include a plurality of pipe sections threadably connected in an end-to-end fashion, a mixing pipe section threadably connected to the plurality of pipe sections, an interior flow path extending axially through the string of pipe, and an exterior annular space extending axially along an exterior of the string of pipe. The mixing pipe section may include a link rod extending through a wall of the mixing pipe section, an inner turbine mounted on the link rod and interfacing with the interior flow path in the mixing pipe section, and an outer impeller mounted on the link rod in the exterior annular space around the mixing pipe section. The method may further include pumping a first fluid through the interior flow path to hydraulically rotate the inner turbine and using hydraulic rotation of the inner turbine to drive rotation of the outer impeller via the link rod connecting the inner turbine and the outer impeller.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
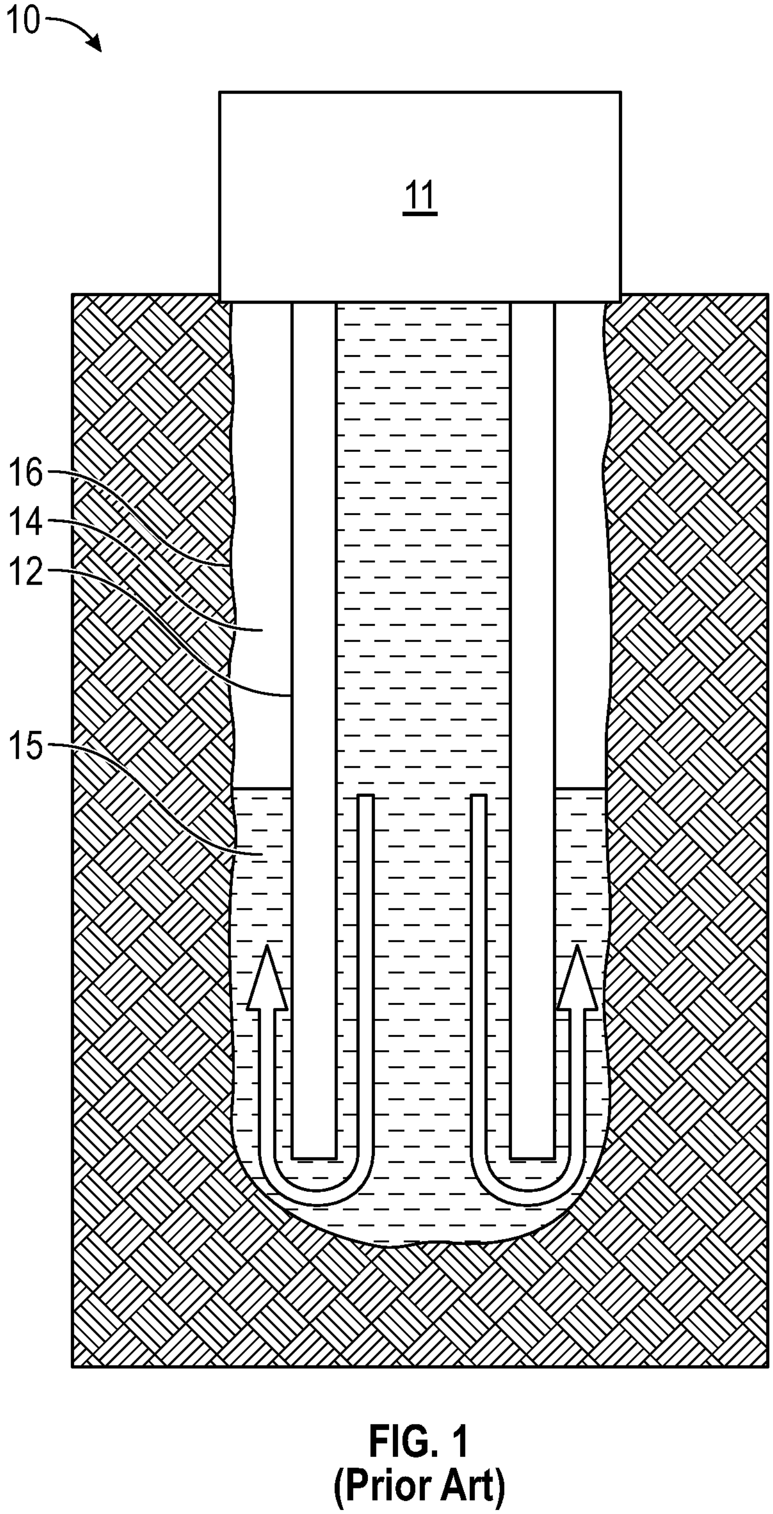
FIG. 1 (Prior Art)
FIG. 1 shows an example of a conventional cementing operation.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application the reference to tubing may refer to a string of casing defined as a large-diameter pipe that may be lowered into a well and connected to the surface of the Earth, to a string of casing (or liner) that may be lowered into a well and connected to an end of a previously installed casing, to a string of production tubing defined as a large-diameter pipe that may be lowered into a well and through which production fluids flow, or other downhole tubing.

In one aspect, embodiments disclosed herein relate to improving the efficiency and quality of cementing operations via the implementation of a hydraulic mixing apparatus to enhance cement mixing and cement distribution around a downhole tubing. Further, in another aspect, embodiments disclosed herein relate to transferring kinetic energy from a fluid in an interior flow path of a tubing to a fluid in an exterior annular space around the tubing via an energy transfer assembly incorporated into a section of the tubing within a wellbore.

Cementing operations often include consideration of many different factors, such as cement pumping pressure, fracturing pressure of a surrounding formation, rheology and composition of the cement, and thickening time of the cement. For example, high pumping pressure of a cement through a formation with relatively low fracturing pressure may result in fracturing of the formation, and fluid losses through the induced cracks. Additionally, due to the relatively high density of cement (e.g., compared with drilling fluids), the relatively higher hydrostatic pressure of a cement column may result in a higher bottom hole pressure (BHP) while pumping the cement, which can induce formation fractures and losses. As a result, many precautions may be taken during cementing operations to determine optimal pumping pressures and/or flow rates for each section of a well being cemented to avoid losses, while also pumping at a high enough rate to displace cement across the entire well section before the cement thickens.

There are some cases in which a high cement pump rate is favored. For example, in formations with high fracture pressure or in situations where cement is being pumped inside casing, a high cement pump rate may be preferable. In these cases, increasing cement flow rate may not induce losses despite a higher BHP. In some instances, higher pumping rates can allow for better drilling fluid removal if turbulent flow is achieved around the annulus, resulting in better cement quality and prevention of cement contamination. However, due to excessive vibrations and limited pumping capacity in current cement pumping units, achieving higher pump rates may be difficult. By using devices according to embodiments of the present disclosure provided along a tubing string being cemented, an improved cementing operation may be achieved using a standard pumping rate of a fluid flowing through the tubing to increase the kinetic energy of a fluid in an annular region around the outside of the tubing string.

Devices according to embodiments of the present disclosure may be provided as a section of pipe with one or more turbine assemblies integrated into the wall of the pipe, where the section of pipe and integrated turbine assemblies may be referred to herein as a mixing pipe section. A mixing pipe section according to embodiments of the present disclosure may be coaxially connected to other sections of pipe to form a string of downhole tubing. Turbine assemblies provided in a mixing pipe section may include a link rod extending through the wall of the pipe section (from an interior of the mixing pipe section to an exterior of the mixing pipe section), an inner turbine mounted on the link rod in the interior of the mixing pipe section, and an outer impeller mounted on the link rod at the exterior of the mixing pipe section, wherein the inner turbine and outer impeller are rotatable about the link rod.

When mixing pipe sections are incorporated into downhole tubing string and used for a cementing operation, cement (or other fluid) may be flowed through the interior of the tubing string, where the interior flow of fluid may rotate the inner turbine in the interior of the mixing pipe section. Rotation of the inner turbine may, in turn, rotate the outer impeller via the connected link rod, which may mix fluid (e.g., cement) flowing around the outside of the tubing string.

Mixing pipe sections according to embodiments of the present disclosure may be used with various types of downhole tubing strings and in various stages of constructing a well. An exemplary well 100 and cementing steps are shown in FIGS. 2A-2D to show examples of various tubing strings and well construction stages that may incorporate mixing pipe sections according to embodiments of the present disclosure.

Figure 2A:
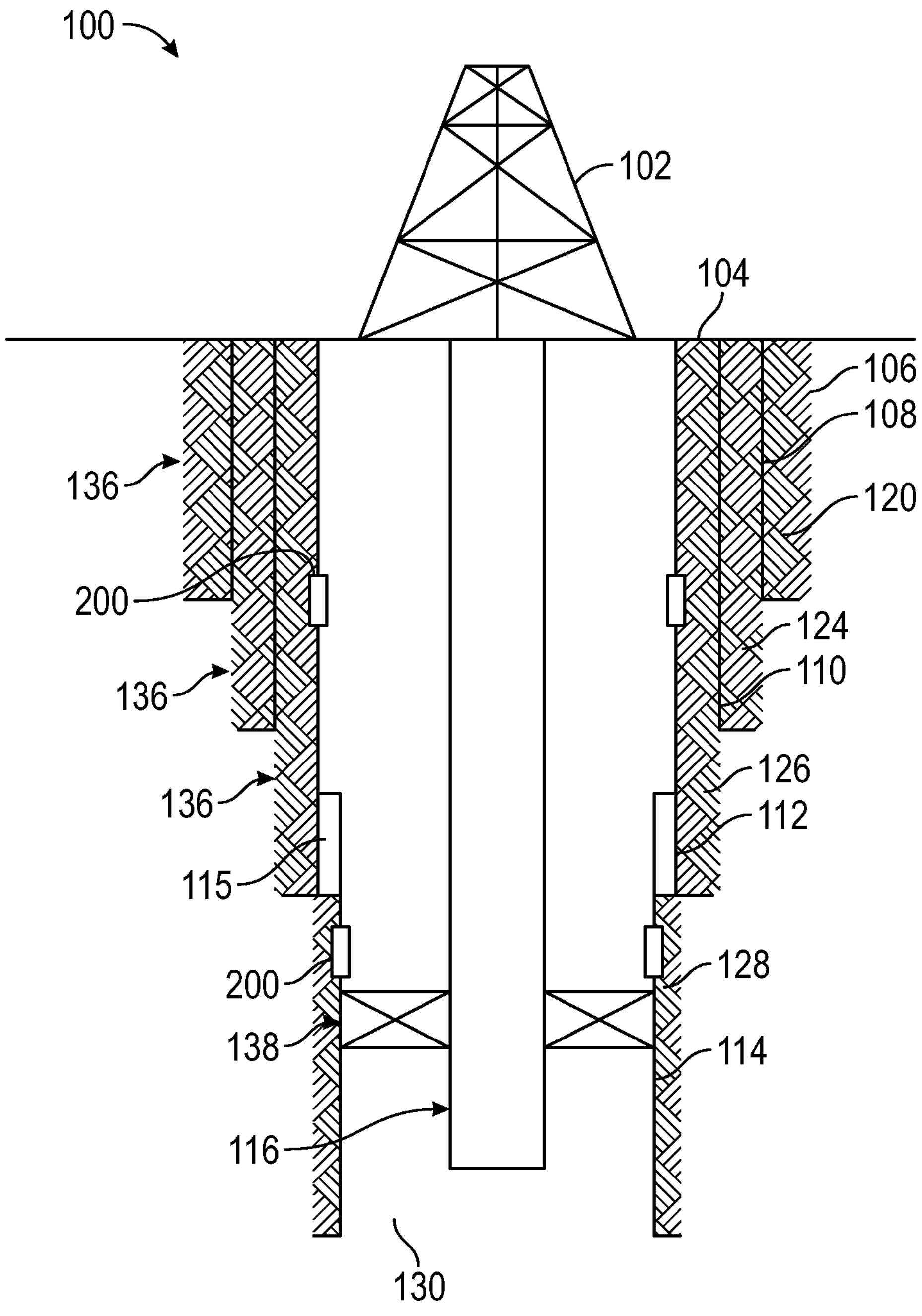
FIG. 2A shows an exemplary well in accordance with one or more embodiments.

FIG. 2A depicts an exemplary well 100 in accordance with one or more embodiments. The well 100 includes a drilling rig 102 located on a surface 104 location that may be the Earth's surface (e.g., on land for onshore operations or on a rig platform for offshore operations). The drilling rig 102 may include equipment used to drill a borehole to form a wellbore 106. Major components of the drilling rig 102 may include drilling fluid tanks, drilling fluid pumps (e.g., rig mixing pumps), a derrick or mast, draw works, a rotary table or top drive, drill string, power generation equipment, and auxiliary equipment. Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole.

As the well 100 is drilled, sections of the wellbore may be cased. Depending on the depth of the well 100 and other operating parameters, multiple strings of casing may be used to case the well 100. In the example shown in FIG. 2A, the well 100 has four strings of casing: conductor casing 108, surface casing 110, intermediate casing 112, and liner casing 114. The conductor casing 108, surface casing 110, and intermediate casing 112 are casing strings that may be installed from casing hangers (not shown) at the surface of the well 100, while the liner casing 114 may be hung from a liner hanger 115 positioned at the end of the intermediate casing 112. Each string of casing, starting with the conductor casing 108 and ending with the liner casing 114, decreases in both outer diameter and inner diameter. One or more casing strings used to case a well may include a mixing pipe section 200 according to embodiments of the present disclosure, which may enhance the flow of cement around the casing string during cementing, thereby improving the cementing of the casing string.

Each string of casing has an annulus that is located around the exterior of the casing string. The first annulus 120 is the space located between the outer diameter of the conductor casing 108 and the wellbore 106. The wellbore 106 is the exposed portion of the subsurface Earth that is exposed after drilling. The first annulus 120 may be filled completely or partially with cement 136. The second annulus 124 includes both the space located between the outer diameter of the surface casing 110 and the inner diameter of the conductor casing 108 as well as the space between the outer diameter of the surface casing 110 and the wellbore 106. The second annulus 124 may be filled completely or partially with cement 136. The third annulus 126 includes both the space located between the outer diameter of the intermediate casing 112 and the inner diameter of the surface casing 110 as well as the space between the outer diameter of the intermediate casing 112 and the wellbore 106. The third annulus 126 may be filled completely or partially with cement 136. The fourth annulus 128 includes the space located between the outer diameter of the liner casing 114 and the wellbore 106. The fourth annulus 128 may be filled completely or partially with cement 136.

Upon completion of casing the well 100, production tubing 116 may be lowered into the well 100. The space around the production tubing 116 (a fifth annulus 130) and the space within the production tubing 116 make up the interior of the well 100. One or more production packers 138 may be installed within the fifth annulus 130, wherein the production packers 138 are sized such that they fit snugly between the outer diameter of the production tubing 116 and the inner diameter of the liner casing 114. The well 100 depicted in FIG. 2A is one example of a well 100 but is not meant to be limiting. The scope of this disclosure may encompass any well 100 design that has at least one string of casing cemented in the well 100.

Figure 2D:
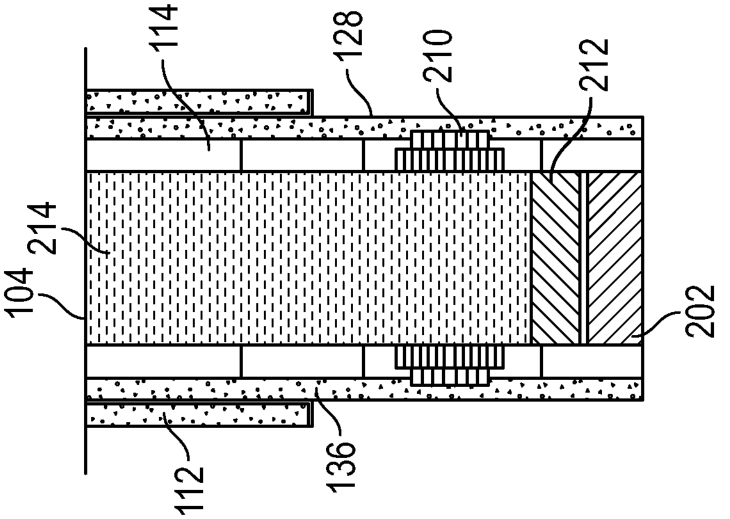
FIG. 2B-D shows stages of cementing the well in FIG. 2A using a hydraulic mixing pipe section integrated with the well in accordance with one or more embodiments.
Figure 2C:
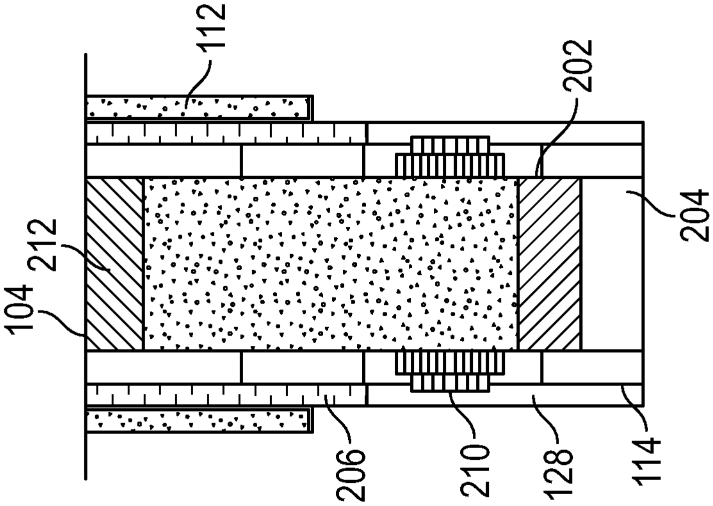
Figure 2B:
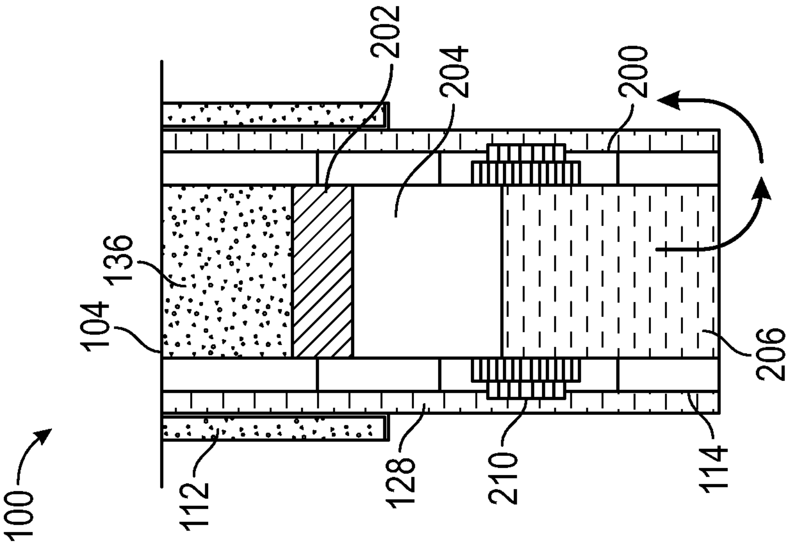

FIGS. 2B-2D show a more detailed view of exemplary steps for cementing tubing strings in the well 100. Although FIGS. 2B-2D detail an example cementing operation for a liner casing 114, cementing may similarly be performed for the other casing strings in the well 100. As shown, a mixing pipe section 200 may be integrated into liner casing 114 by connecting the mixing pipe section 200 and other sections of casing pipe in an end-to-end fashion to form the string of liner casing 114. The mixing pipe section 200 may include one or more turbine assemblies 210, which may interact with fluid flow through and around the liner casing 114. According to embodiments of the present disclosure, a mixing pipe section 200 may be assembled in any string of casing or tubing disposed within a wellbore.

FIG. 2B shows the beginning stages of an example cementing operation. In general, after completion of a drilling stage (and after circulating drilling fluid 206) through the well, a spacer 204 may first be pumped downhole to prepare the well 100 for cementing operations, where the spacer 204 may be used to push out any remaining drilling fluid 206. Use of a spacer fluid to clear out remaining drilling fluid may reduce cement contamination and allow for better cement-casing bonding. A bottom plug 202 may then be pumped downhole through the liner casing 114 to prevent contamination of the cement 136, which could result from mixing with any remaining drilling fluid 206. Cement 136 may be pumped downhole in a calculated volume to ensure that the cement 136 completely covers the annulus 128 around the liner casing 114.

FIG. 2C shows a top plug 212, which is pumped through the liner casing 114 following the cement 136. Displacement fluid 214, as shown in FIG. 2D, may then be pumped through the liner casing 114 to ensure that the cement 136 is fully pumped out of the interior of the liner casing 114 and that the cement 136 fills the entire annulus 128.

As fluid (e.g., the drilling fluid 206, spacer fluid 204, cement 136, and displacement fluid 214) is flowed through the interior of the liner casing 114, the fluid may flow through an inner turbine in the turbine assembly 210 to rotate the turbine assembly 210. Rotation of the inner turbine also rotates an outer impeller of the turbine assembly 210, which aids in movement of the fluid flowing around the annulus 128 of the liner casing 114. In such manner, the turbine assembly 210 may improve the flow of fluids around the annulus of a tubing, which may improve cement coverage around the annulus of the tubing when cement is being flowed through the annulus. While FIGS. 2B-2D illustrate cementing the fourth annulus 128, cementing may similarly be performed for the first annulus 120, the second annulus 124, and the third annulus 126 shown in FIG. 2A.

Figure 3:
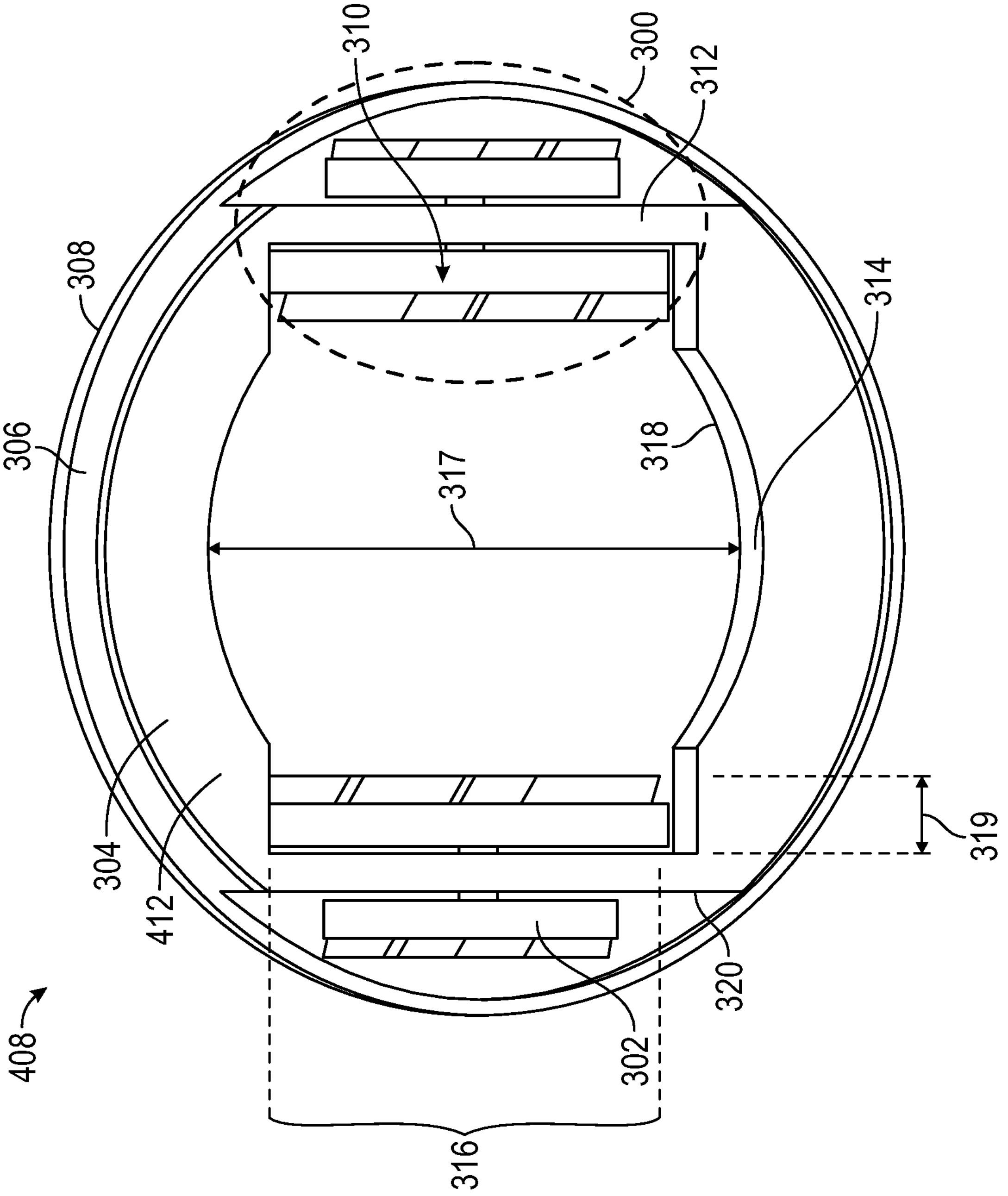
FIG. 3 shows a cross-sectional view of a hydraulic mixing pipe section in accordance with one or more embodiments.
Figure 4:
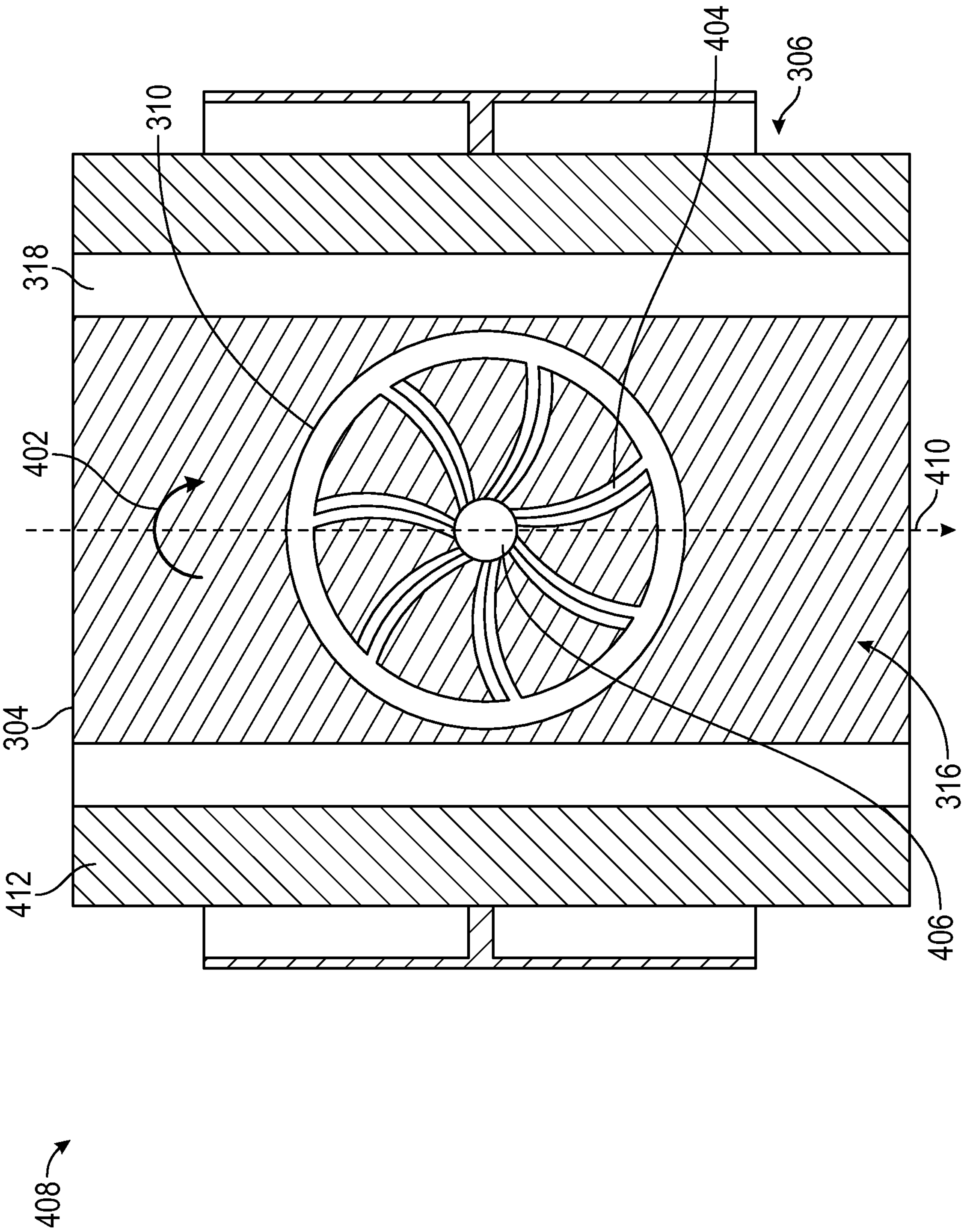
FIG. 4 shows a cross-sectional view of a hydraulic mixing apparatus in accordance with one or more embodiments.

Referring now to FIG. 3 and FIG. 4, FIG. 3 and FIG. 4 show more detailed views of example mixing pipe sections and turbine assemblies according to embodiments of the present disclosure. FIG. 3 shows a cross-sectional view of a mixing pipe section 408 according to embodiments of the present disclosure taken along a plane extending along a latitudinal axis of the mixing pipe section 408. FIG. 4 depicts a cross-sectional view of the hydraulic mixing pipe section 408 taken along a plane extending along the longitudinal axis.

With reference to FIG. 3 and FIG. 4, the mixing pipe section 408 may have a tubular body 304 formed by a generally cylindrical wall 412. An inner surface 318 of the wall 412 may define an interior flow path 410 extending axially through the tubular body 304. One or more turbine assemblies 300 may be assembled along portions 312, 320 of the wall 412 sized and shaped corresponding to the components of the turbine assembly 300. A turbine assembly 300 may include a link rod 406 extending through the portion 312, 320 of the wall 412 (from an interior of the tubular body to an exterior of the tubular body), an inner turbine 310 mounted on the link rod 406 in the interior of the tubular body, and an outer impeller 302 mounted on the link rod 406 at the exterior of the tubular body.

As shown in FIG. 3, two turbine assemblies 300 may be assembled around the tubular body 304, where a first turbine assembly 300 may be assembled along a first portion 312 of the wall, and a second turbine assembly 300 may be assembled along a second portion 320 of the wall. The second portion 320 of the wall may be opposite to the first portion 312 of the wall such that the first turbine assembly 300 and the second turbine assembly 300 are arranged in a parallel fashion about a center of the tubular body 304. In other embodiments, a mixing pipe section may have less than two (one) turbine assembly, or more than two turbine assemblies positioned circumferentially around the tubular body 304.

With reference to FIG. 3 and FIG. 4, the inner turbine 310, having a plurality of blades 404 extending radially outward from the center of the inner turbine 310, may be located in an interior space of a tubular body 304. For example, the portions 312, 320 of the wall 412 may be planar and/or recessed from the interior flow path 410, such that an inset 316 is formed. The inner turbine 310 may be positioned in the inset 316, such that an inner side of the inner turbine interfaces with the interior flow path 410, and an opposite outer side of the inner turbine interfaces with the planar portion 312, 320 of the wall 412. The inset 316 may be sized and shaped corresponding to the size of the inner turbine 310 (e.g., a depth 319 of the inset 316 may be close to or the same as the thickness of the inner turbine), such that when the inner turbine 310 is positioned in the inset 316, the inner diameter 317 of the interior flow path 410 is maintained between the inner side(s) of the inner turbine(s). A third portion of the wall 314, which may be curved, may connect the two insets 316 and may create a smooth inner surface of the wall 318.

The outer impeller 302, having a plurality of blades 403 extending radially outward from the center of the outer impeller 302, may be disposed in an annulus 306 area around the exterior of the tubular body 304. For example, the portions 312, 320 of the wall 412 may have a planar exterior surface, on which the outer impeller 302 may be disposed. In one or more embodiments, a diameter of the inner turbine 310 may be greater than a diameter of the outer impeller 302.

A link rod 406, which extends through the portions 312, 320 of the wall 312, may connect the inner turbine 310 and the outer impeller 302, such that the center of the inner turbine 310 is mounted to a first end of the link rod 406 and the center of the outer impeller 302 is mounted to a second end of the link rod 406, creating a turbine assembly 300. Further, the inner turbine 310 and the outer turbine 302 may be rotatable about a rotational axis extending through the link rod 406. In one or more embodiments, the link rod may be rigid. The inner turbine 310 and the outer impeller 302 may be rotated 402 in sync via the link rod 406, such that when the inner turbine 310 rotates, the outer impeller 302 also rotates, and vice versa.

Figure 5:
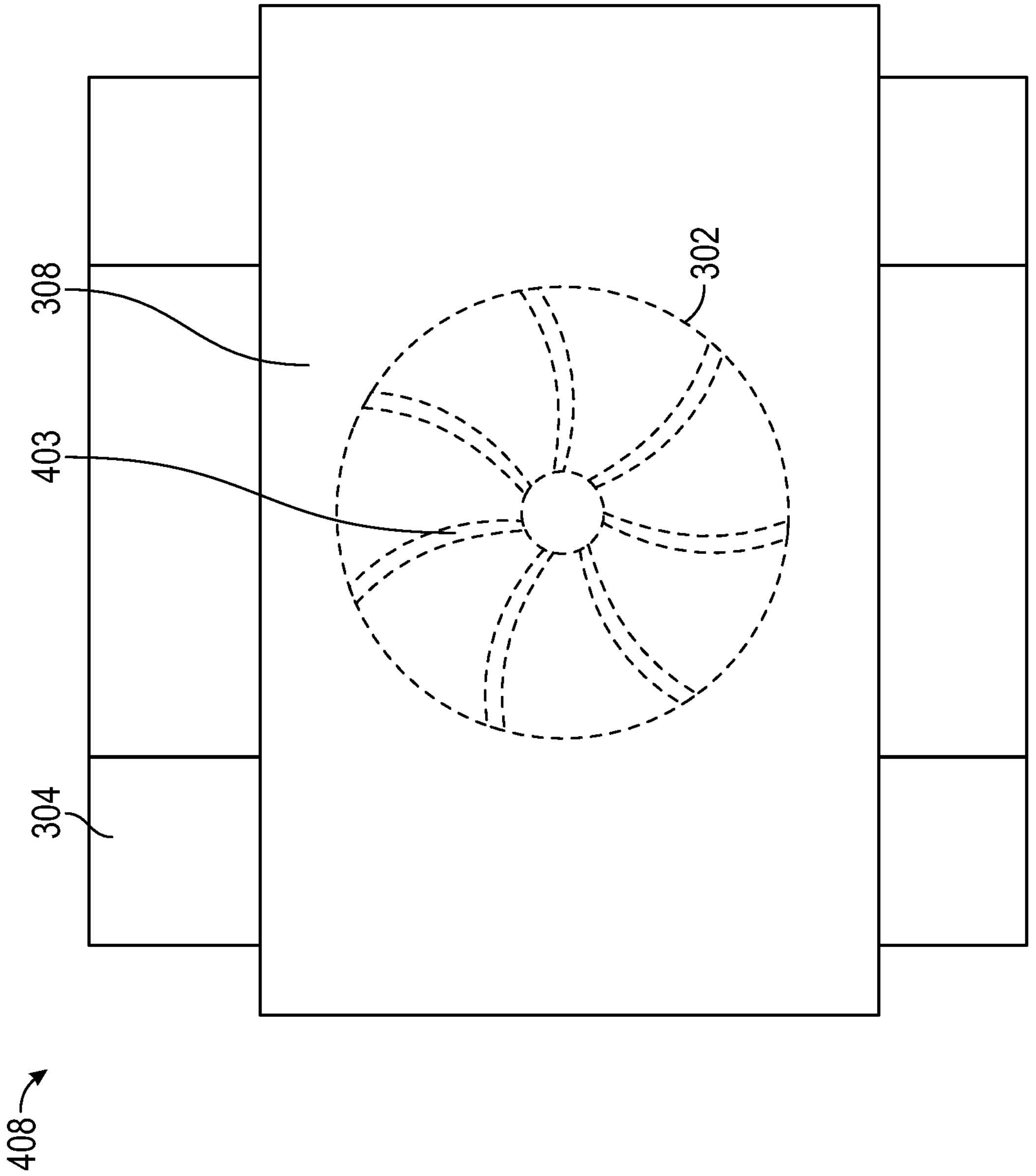
FIG. 5 shows a side view of a hydraulic mixing pipe section in accordance with one or more embodiments.

FIG. 5 shows an exterior side view of a hydraulic mixing pipe section 408. A protective shield 308 may be used to protect outer impeller(s) 302 assembled around the exterior of the tubular body 304 of the mixing pipe section 408. For example, in the embodiment shown, a protective shield may extend around the entire outer circumference of the tubular body 304, such that it surrounds the outer impellers 302. In some embodiments, the protective shield 308 may be made of the same material as the tubular body 304. However, there are alternate embodiments where the protective shield 308 may be composed of a different material than the tubular body 304. The protective shield 308 may be attached to the exterior of the tubular body 304, for example, by welding. The protective shield 308 may protect the outer impellers 302 from downhole conditions, such as temperature or pressure.

Figure 6:
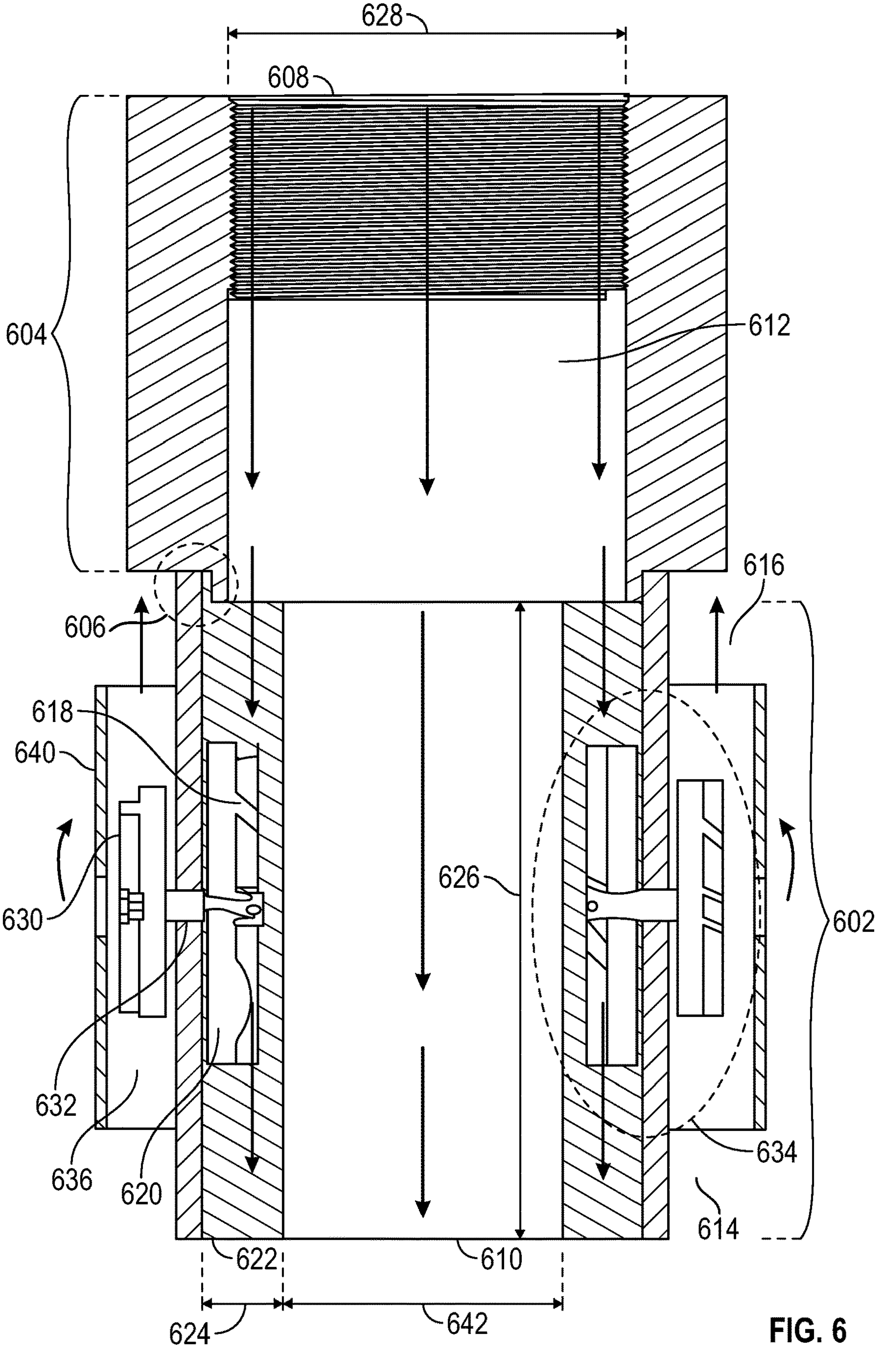
FIG. 6 shows a cross-sectional view of a hydraulic mixing pipe section in accordance with one or more embodiments.

Turning now to FIG. 6, FIG. 6 shows an embodiment of a hydraulic mixing pipe section 602 and its operation during cementing in a well (e.g., the well 100 depicted in FIG. 2). The hydraulic mixing pipe section 602 may be coaxially connected to a section of casing 604 via a connection 606 (e.g., a threaded connection). The section of casing 604 may be coaxially connected to other sections of casing pipe via threaded connections 608, such that the hydraulic mixing pipe section 602 may be coaxially joined to other casing 604 sections to form a casing string.

The mixing pipe section 602 may include a tubular body 610 having turbine assemblies 634 assembled around the tubular body 610, where each turbine assembly 634 includes an inner turbine 620 connected to an outer impeller 630 via a link rod 632.

Fluid may flow through an interior flow path 612 formed through the tubular body 610 to the bottom of the well, where fluid may be propelled into an annulus 614 around the exterior of the tubular body 610, and flow along an exterior flow path 616. As fluid flows through the interior flow path 612, fluid flow may interact with the blades 618 of the inner turbine 620, such that rotation of the inner turbine 620 is induced. For example, in the embodiment shown, the inner turbine 620 may be positioned in an inset 622 having a depth 624 and extending an axial length 626 of the mixing pipe section 602 to form a channel extending along the inner surface of the mixing pipe section wall. Fluid may flow along interior flow path 612 through the interior of the casing 604 into the inset 622 and the interior of the tubular body 610. As a result, fluid may be propelled through the blades 618 of the inner turbine 620, causing rotation of the inner turbine 620.

Rotation of the inner turbine 620 may rotate the outer impeller 630 via the connected link rod 632. Thus, due to the linked rotation of the inner turbine 620 and outer impeller 630 in a turbine assembly 634, the inner turbine 620 and outer impeller 630 in the same turbine assembly 634 may rotate at the same rotational speed and in the same direction. As fluid flows through the annulus 614 around the exterior of the mixing pipe section 602, fluid may flow through a space 636 formed between the exterior surface of the tubular body 610 and a protective shield 640. As fluid flows through the space 636 within the protective shield 640, the fluid may flow through the outer impellers 630 positioned in the space 636. Because a cementing operation involves directing fluid in a first direction down the interior flow path 612 and then back up in an opposite second direction through the exterior flow path 616, fluid flow through the space 636 within the protective shield 640 may flow from a bottom side of the protective shield 640, through the outer impeller 630, and out of an upper side of the protective shield 640. The rotation of the linked inner turbine 620 may transfer energy to the outer impeller 630, which may create an additional pressure gradient in the annulus 614 and enhance fluid mixing through the exterior flow path 616.

According to embodiments of the present disclosure, an inner turbine 620 and linked outer impeller 630 in a turbine assembly 634 may be designed to have a larger hydrodynamic drag applied to the inner turbine 620 than the outer impeller 630 to ensure the inner turbine 620 is transferring the consumed energy towards the outer impeller 630 to enhance fluid mixing. The relative size and shape of both the inner turbine 620 and outer impeller 630 can be modified to provide optimized energy transferring results. For example, as in the embodiment shown, the diameter of the inner turbine 620 may be larger than the diameter of the outer impeller 630.

In some embodiments, an inner diameter 642 of the hydraulic mixing pipe section 602 may be larger than the inner diameter 628 of the casing 604. In a cementing operation, an example of which is shown in FIGS. 2B-2D, this may ensure that a bottom plug and top plug are able to pass through the hydraulic mixing pipe section 602 with ease. In one or more embodiments, the inner diameter 642 of the hydraulic mixing pipe section 602 may be equal to or slightly smaller than the inner diameter 628 of the casing 604. In embodiments where the inner diameter 642 is slightly smaller than the inner diameter 628 of the casing 604 (e.g., as shown in FIG. 6), if a top or bottom plug is to be used in the cementing operation, the plug may be deformable to pass through the reduced path through the mixing pipe section 602.

FIG. 6 is not necessarily drawn to scale and certain relative dimensions may be different in practice. For example, a connection 606 between a hydraulic mixing pipe section 602 and a section of casing 604 may have a longer axial length than shown (e.g., to provide a longer threaded connection), and the difference between the inner diameter 642 of the mixing pipe section and inner diameter 628 of the casing may be smaller than shown (or there may no difference between the inner diameters 642, 628).

Figure 7:
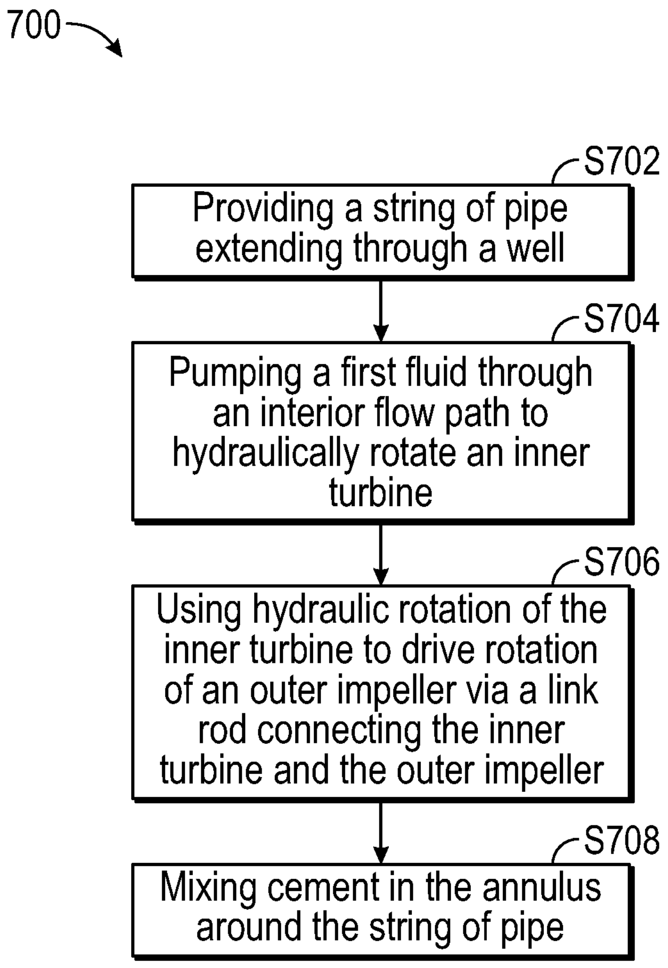
FIG. 7 shows a flowchart of a method in accordance with one or more embodiments.

FIG. 7 shows a method 700 in accordance with one or more embodiments. More specifically, FIG. 7 shows a method for hydraulically improving cement mixing during a cementing operation. Further, one or more blocks in FIG. 7 may be performed by one or more components as described in FIGS. 1-6. While the various blocks in FIG. 8 are presented and described sequentially, one of ordinary skill in the art will appreciate that some or all of the blocks may be combined, and some or all of the blocks may be executed in parallel. Furthermore, the blocks may be performed actively or passively. For clarity, the embodiment depicted in FIG. 6 is used in the following description, however the method 700 may apply to any mixing pipe section connected to any string of casing.

Initially, a string of pipe may be provided, which may extend through a well, S702. In some embodiments, the string of pipe may be casing. In other embodiments, the string of pipe may be production tubing. In one or more embodiments, the string of pipe may comprise a plurality of pipe sections threadably connected in an axial end-to-end fashion. Further, one or more hydraulic mixing pipe sections 602 may be threadably connected along the plurality of pipe sections in the axial end-to-end configuration. A hydraulic mixing pipe section 602 may have one or more turbine assemblies 634 assembled around the wall of the pipe, where each turbine assembly 634 may include a link rod 632 extending through the wall of the hydraulic mixing pipe section 602, an inner turbine 620 mounted on a first end of the link rod 632, and an outer impeller 630 mounted on a second end of the link rod 632.

An interior flow path 612 may extend axially through the string of pipe, and an exterior annular space, which may be referred to as an annulus 614, may extend axially along an exterior of the string of pipe. In one or more embodiments, the annulus 614 may be formed between the string of pipe and another string of pipe. In other embodiments, the annulus 614 may be formed between the string of pipe and the wellbore. The inner turbine 620 may be mounted in the interior of the string of pipe, interfacing with the interior flow path 612. The outer impeller 630 may interface with the annulus 614 on the exterior of the string of pipe.

A first fluid may be pumped through the interior flow path 612 in order to hydraulically rotate the inner turbine 620, S704. In one or more embodiments, the first fluid may be cement. In other embodiments, the first fluid may be drilling fluid or spacer. In one or more embodiments, a second fluid may be pumped through the interior flow path 612 after the first fluid, wherein the second fluid may be different than the first fluid. The first fluid may be moved through the interior flow path 612 to an axial end of the interior flow path 612, where the first fluid may be directed to the annulus 614. In such embodiments, the first fluid may then flow along an exterior flow path 616 through the annulus 614 in an opposite direction than through the interior flow path 612. The movement of the first fluid through the interior flow path 612 may induce hydraulic rotation of the inner turbine 620.

Hydraulic rotation of the inner turbine 620 may be used to drive rotation of an outer impeller 630 via a link rod 632, which connects the inner turbine 620 and outer impeller 630, S706. The relative shape and size of both the inner turbine 620 and the outer impeller 630 may be modified to provide optimal energy transfer from rotation of the inner turbine 620 to the outer impeller 630 in order to create an additional pressure gradient in the annulus 614 (thereby improving fluid flow through the annulus 614). For example, in one or more embodiments, a diameter of the inner turbine 620 may be larger than a diameter of the outer impeller 630 to provide an increased pressure gradient in the annulus 614 as the outer impeller 630 is rotated by the inner turbine 620. Additionally, rotation of the outer impeller 630 may break any formed fluid interfaces and may generate highly turbulent kinetic energy in the exterior flow path 616. Rotation of the inner turbine 620 may transfer consumed energy towards the outer impeller 630, which in turn may transfer the energy to the fluid in the annulus 614, resulting in enhanced fluid mixing in the annulus 614. In embodiments where the first fluid is cement, such energy transfer and increased pressure gradient may help mix the cement into a homogenous fluid, S708, and ensure better cement distribution across the annulus 614.

In one or more embodiments, the outer impeller may be covered with a protective shield 640. In some embodiments, the first fluid may be cement, however there are other embodiments in which the first fluid may be drilling fluid or spacer, for example. Additionally, method 700 may be utilized for improved hydraulic mixing of cement during a cementing operation. However, there are many other applications for method 700. For example, method 700 may also improve drilling fluid removal during spacer displacement.

Embodiments of the present disclosure may provide at least one of the following advantages. In cementing operations, cement should be properly distributed across the entire casing to cement the casing in place. As such, it is beneficial for the cement to be properly mixed into a homogenous fluid. Hydraulic mixing pipe sections according to embodiments of the present disclosure may improve mixing of cement in the annulus around a casing (or other string of tubing) by transferring kinetic energy from a fluid flowing through an interior of the pipe section to a fluid flowing in the opposite direction through an exterior annular space. This transfer of kinetic energy may improve cement mixing, which may lead to improved cement distribution, improved quality of cement operations, reduced overall time of cement operations, and a reduced cost of cement operations.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A pipe section, comprising:

a tubular body comprising a wall defining an interior flow path extending axially through the tubular body;

a turbine assembly assembled to a first portion of the wall, the turbine assembly comprising:

a link rod extending through the wall, from an interior of the tubular body to an exterior of the tubular body;

an inner turbine mounted on the link rod in the interior of the tubular body, wherein the inner turbine is rotatable about the link rod; and an outer impeller mounted on the link rod at the exterior of the tubular body, wherein the outer impeller is rotatable about the link rod; and a protective shield disposed around the outer impeller; and fluid cement disposed in a space between the outer impeller and the protective shield.

2. The pipe section of claim 1, wherein the first portion of the wall is planar, and wherein a second portion of the wall is curved.

3. The pipe section of claim 1, wherein the inner turbine is held within an inset formed in an inner surface of the wall.

4. The pipe section of claim 1, wherein the inner turbine has a diameter greater than the outer impeller.

5. The pipe section of claim 1, further comprising a second turbine assembly assembled to a second portion of the wall, opposite from the first portion of the wall, the second turbine assembly comprising:

a second link rod extending through the wall;

a second inner turbine mounted to the second link rod in the interior of the tubular body, wherein the second inner turbine is rotatable about the second link rod; and a second outer impeller mounted to the second link rod at the exterior of the tubular body, wherein the second outer impeller is rotatable about the second link rod.

6. The pipe section of claim 1, wherein the inner turbine comprises a plurality of blades extending radially outward from the link rod.

7. A system, comprising:

a casing disposed in a wellbore within a well, wherein an annulus is created between the casing and the wellbore; and a mixing pipe section coaxially connected to the casing, the mixing pipe section comprising:

a turbine assembly assembled to a wall of the mixing pipe section, the turbine assembly comprising:

a link rod extending through the wall, from an interior of the mixing pipe section to an exterior of the mixing pipe section;

an inner turbine mounted on the link rod in the interior of the mixing pipe section, wherein the inner turbine is rotatable about the link rod; and an outer impeller mounted on the link rod at the exterior of the mixing pipe section, such that the outer impeller is disposed in the annulus, wherein the outer impeller is rotatable about the link rod; and fluid cement filled within the annulus around the mixing pipe section.

8. The system of claim 7, wherein an inset is formed along an inner surface of the wall, the inset extending axially along the mixing pipe section, wherein the inner turbine is held within the inset.

9. The system of claim 7, wherein the link rod is rigid.

10. The system of claim 7, wherein the inner turbine comprises a plurality of blades extending radially outward from the link rod.

11. The system of claim 10, wherein the outer impeller comprises a plurality of blades extending a radial distance from the link rod greater than the plurality of blades of the inner turbine.

12. The system of claim 7, wherein the mixing pipe section is threadably connected to the casing.

13. The system of claim 7, wherein a protective shield is disposed in the annulus around the outer impeller.

14. The system of claim 7, wherein an inner diameter of the mixing pipe section is larger than an inner diameter of the casing.

15. A method, comprising:

providing a string of pipe extending through a well, wherein the string of pipe comprises:

a plurality of pipe sections threadably connected in an end-to-end fashion;

a mixing pipe section threadably connected to the plurality of pipe sections;

an interior flow path extending axially through the string of pipe; and an exterior annular space extending axially along an exterior of the string of pipe;

wherein the mixing pipe section comprises:

a link rod extending through a wall of the mixing pipe section;

an inner turbine mounted on the link rod and interfacing with the interior flow path in the mixing pipe section; and an outer impeller mounted on the link rod in the exterior annular space around the mixing pipe section;

pumping a cement through the interior flow path to hydraulically rotate the inner turbine; and using hydraulic rotation of the inner turbine to drive rotation of the outer impeller via the link rod connecting the inner turbine and the outer impeller.

16. The method of claim 15, further comprising covering the outer impeller with a protective shield.

17. The method of claim 15, further comprising:

moving the cement from an axial end of the interior flow path into the exterior annular space, wherein the first fluid flows in an opposite direction through the exterior annular space than through the interior flow path; and using the rotation of the outer impeller to create an additional pressure gradient in the exterior annular space.

18. The method of claim 15, further comprising pumping a second fluid through the interior flow path before or after the cement, wherein the second fluid is different than the cement.

19. The method of claim 15, wherein the string of pipe is casing, and wherein an annulus is created between the casing and a well wall.

* * * * *